US012186598B2

(12) United States Patent
Henderson et al.

(10) Patent No.: US 12,186,598 B2
(45) **Date of Patent: *Jan. 7, 2025**

(54) RESPIRATOR TAB

(71) Applicant: 3M INNOVATIVE PROPERTIES COMPANY, St. Paul, MN (US)

(72) Inventors: Christopher P. Henderson, High Shincliffe (GB); Reyad A. Abdulqader, Stockton-on-Tees (GB); Ciaran G. McMenamin, Newton Aycliffe (GB); Audra A. Wilson, Gateshead (GB); John M. Facer, Langley Park (GB)

(73) Assignee: 3M Innovative Properties Company, St. Paul, MN (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/811,968

(22) Filed: Jul. 12, 2022

(65) Prior Publication Data

US 2022/0339474 A1 Oct. 27, 2022

Related U.S. Application Data

(63) Continuation of application No. 15/572,515, filed as application No. PCT/US2016/031434 on May 9, 2016, now Pat. No. 11,413,481.

(30) Foreign Application Priority Data

May 12, 2015 (GB) ..................................... 1508114

(51) Int. Cl.

| | |
|---|---|
| ***A62B 23/02*** | (2006.01) |
| ***A41D 13/11*** | (2006.01) |
| ***A62B 18/10*** | (2006.01) |

(52) U.S. Cl.

CPC ............ *A62B 23/025* (2013.01); *A41D 13/11* (2013.01); *A41D 13/1115* (2013.01); *A62B 18/10* (2013.01)

(58) Field of Classification Search

CPC ....... A62B 23/00; A62B 23/02; A62B 23/025; A62B 18/02; A62B 18/025; A62B 18/08; A62B 18/10; A41D 13/11; A41D 13/1115

See application file for complete search history.

(56) References Cited

U.S. PATENT DOCUMENTS

| | | | |
|---|---|---|---|
| 715,052 | A | 12/1902 | Goodwin |
| 2,072,516 | A | 3/1937 | Ferenci |

(Continued)

FOREIGN PATENT DOCUMENTS

| | | |
|---|---|---|
| CN | 1220901 | 6/1999 |
| CN | 201270776 | 7/2009 |

(Continued)

OTHER PUBLICATIONS

"20 Pack NIOSH N95 Respirator", Menards, [retrieved from the internet on Jun. 29, 2017], URL <http://www.menards.com/main/paint/drop-cloths-plastic-sheeting/protective-wear/respiratory-protection/20-pack-niosh-n95-respirator/p-2006906-c-13847.htm> pp. 1-2.

(Continued)

*Primary Examiner* — Keri J Nelson

(57) ABSTRACT

A personal respiratory protection device comprising an upper panel, a central panel, and a lower panel, the central panel being separated from each of the upper and lower panels by a first and second fold, seam, weld or bond, respectively, such that device is capable of being folded flat for storage along the first and second fold, seam, weld or bond and opened to form a cup-shaped air chamber over the nose and mouth of the wearer when in use, wherein the (Continued)

upper panel has a graspable upper tab, the upper tab being graspable in use to open the device.

16 Claims, 8 Drawing Sheets

(56) References Cited

U.S. PATENT DOCUMENTS

| | | | |
|---|---|---|---|
| 2,230,770 | A | 2/1941 | Van Almelo |
| 2,290,885 | A | 7/1942 | Lehmberg |
| 2,378,929 | A | 6/1945 | Joyce |
| 2,507,447 | A | 5/1950 | La Joie |
| 2,895,472 | A | 7/1959 | Matheson |
| 3,038,470 | A | 6/1962 | Campbell |
| 3,603,315 | A | 9/1971 | Becker, III |
| 3,834,384 | A | 9/1974 | Raines |
| 3,888,246 | A | 6/1975 | Lauer |
| 3,890,966 | A | 6/1975 | Aspelin et al. |
| 3,971,369 | A | 7/1976 | Aspelin |
| 3,974,829 | A | 8/1976 | Tate, Jr. |
| 3,985,132 | A | 10/1976 | Boyce |
| 4,013,816 | A | 3/1977 | Sabee |
| 4,037,593 | A | 7/1977 | Tate, Jr. |
| 4,077,404 | A | 3/1978 | Elam |
| 4,090,510 | A | 5/1978 | Segersten |
| 4,100,324 | A | 7/1978 | Anderson |
| 4,118,531 | A | 10/1978 | Hauser |
| 4,215,682 | A | 8/1980 | Kubik |
| 4,319,567 | A | 3/1982 | Magidson |
| 4,375,718 | A | 3/1983 | Wadsworth |
| 4,417,575 | A | 11/1983 | Hilton |
| 4,419,993 | A | 12/1983 | Petersen |
| 4,419,994 | A | 12/1983 | Hilton |
| 4,429,001 | A | 1/1984 | Kolpin |
| 4,520,509 | A | 6/1985 | Ward |
| 4,536,440 | A | 8/1985 | Berg |
| 4,588,537 | A | 5/1986 | Klasse |
| 4,592,815 | A | 6/1986 | Nakao |
| 4,630,604 | A | 12/1986 | Montesi |
| 4,635,628 | A | 1/1987 | Hubbard |
| 4,641,645 | A | 2/1987 | Tayebi |
| 4,688,566 | A | 8/1987 | Boyce |
| 4,790,306 | A | 12/1988 | Braun |
| 4,798,850 | A | 1/1989 | Brown |
| 4,807,619 | A | 2/1989 | Dyrud |
| 4,827,924 | A | 5/1989 | Japuntich |
| 4,850,347 | A | 7/1989 | Skov |
| 4,873,972 | A | 10/1989 | Magidson |
| 4,930,161 | A | 6/1990 | Cohen |
| 4,934,362 | A | 6/1990 | Braun |
| 4,971,052 | A | 11/1990 | Edwards |
| 4,974,586 | A | 12/1990 | Wandel |
| 4,981,134 | A | 1/1991 | Courtney |
| 5,035,239 | A | 7/1991 | Edwards |
| 5,062,421 | A | 11/1991 | Burns |
| 5,103,337 | A | 4/1992 | Schrenk |
| D326,541 | S | 5/1992 | McBrearty |
| 5,217,794 | A | 6/1993 | Schrenk |
| 5,237,986 | A | 8/1993 | Seppala |
| 5,307,796 | A | 5/1994 | Kronzer |
| 5,325,892 | A | 7/1994 | Japuntich |
| 5,360,659 | A | 11/1994 | Arends |
| 5,394,568 | A | 3/1995 | Brostrom |
| 5,419,318 | A | 5/1995 | Tayebi |
| 5,446,925 | A | 9/1995 | Baker |
| 5,464,010 | A | 11/1995 | Byram |
| 5,481,763 | A | 1/1996 | Brostrom |
| 5,486,949 | A | 1/1996 | Schrenk |
| 5,496,507 | A | 3/1996 | Angadjivand |
| 5,505,197 | A | 4/1996 | Scholey |
| 5,509,436 | A | 4/1996 | Japuntich |
| 5,558,089 | A | 9/1996 | Castiglione |
| 5,561,863 | A | 10/1996 | Carlson, III |
| 5,617,849 | A | 4/1997 | Springett |
| 5,628,308 | A | 5/1997 | Harges, Jr. |
| 5,656,368 | A | 8/1997 | Braun |
| 5,682,879 | A | 11/1997 | Bowers |
| 5,687,767 | A | 11/1997 | Bowers |
| 5,699,791 | A | 12/1997 | Sukiennik |
| 5,701,893 | A | 12/1997 | Kern |
| D389,239 | S | 1/1998 | Scholey |
| 5,704,063 | A | 1/1998 | Tilden |
| 5,717,991 | A | 2/1998 | Nozaki |
| 5,724,677 | A | 3/1998 | Bryant |
| 5,724,964 | A | 3/1998 | Brunson |
| 5,804,295 | A | 9/1998 | Braun |
| 5,813,398 | A | 9/1998 | Baird |
| 5,819,731 | A | 10/1998 | Dyrud |
| 5,825,543 | A | 10/1998 | Ouderkirk |
| 5,829,443 | A | 11/1998 | Shigematsu |
| 5,865,172 | A | 2/1999 | Butler |
| 5,882,774 | A | 3/1999 | Jonza |
| 5,884,336 | A | 3/1999 | Stout |
| 5,906,507 | A | 5/1999 | Howard |
| 5,908,598 | A | 6/1999 | Rousseau |
| 5,924,420 | A | 7/1999 | Reischel |
| 5,927,280 | A | 7/1999 | Miyake |
| D412,573 | S | 8/1999 | Castiglione |
| D416,323 | S | 11/1999 | Henderson |
| 6,041,782 | A | 3/2000 | Angadjivand |
| 6,045,894 | A | 4/2000 | Jonza |
| 6,047,698 | A | 4/2000 | Magidson |
| D424,688 | S | 5/2000 | Bryant |
| 6,062,220 | A | 5/2000 | Whitaker et al. |
| 6,062,221 | A | 5/2000 | Brostrom |
| 6,095,143 | A | 8/2000 | Dyrud |
| 6,096,247 | A | 8/2000 | Ulsh |
| 6,102,039 | A | 8/2000 | Springett |
| 6,102,040 | A | 8/2000 | Tayebi |
| 6,116,236 | A | 9/2000 | Wyss |
| 6,119,692 | A | 9/2000 | Byram |
| 6,123,077 | A | 9/2000 | Bostock |
| D431,647 | S | 10/2000 | Henderson |
| 6,125,849 | A | 10/2000 | Willliams |
| 6,148,817 | A | 11/2000 | Bryant |
| D434,879 | S | 12/2000 | Cole |
| 6,157,490 | A | 12/2000 | Wheatley |
| 6,173,712 | B1 | 1/2001 | Brunson |
| 6,179,948 | B1 | 1/2001 | Merrill |
| 6,186,140 | B1 | 2/2001 | Hoague |
| 6,207,260 | B1 | 3/2001 | Wheatley |
| 6,234,171 | B1 | 5/2001 | Springett |
| D443,927 | S | 6/2001 | Chen |
| 6,257,235 | B1 | 7/2001 | Bowen |
| 6,277,178 | B1 | 8/2001 | Holmquist-Brown |
| D448,472 | S | 9/2001 | Chen |
| 6,332,465 | B1 | 12/2001 | Xue |
| 6,336,459 | B1 | 1/2002 | Miyake |
| 6,352,761 | B1 | 3/2002 | Hebrink |
| 6,354,296 | B1 | 3/2002 | Baumann |
| 6,375,886 | B1 | 4/2002 | Angadjivand |
| 6,391,429 | B1 | 5/2002 | Senkus |
| 6,394,090 | B1 | 5/2002 | Chen |
| 6,397,458 | B1 | 6/2002 | Jones |
| 6,398,847 | B1 | 6/2002 | Jones |
| 6,406,657 | B1 | 6/2002 | Eitzman |
| 6,409,806 | B1 | 6/2002 | Jones |
| 6,454,986 | B1 | 9/2002 | Eitzman |
| D464,725 | S | 10/2002 | Petherbridge |
| 6,457,473 | B1 | 10/2002 | Brostrom |
| 6,460,539 | B1 | 10/2002 | Japuntich |
| 6,484,722 | B2 | 11/2002 | Bostock |
| 6,492,286 | B1 | 12/2002 | Berrigan |
| RE37,974 | E | 2/2003 | Bowers |
| 6,520,181 | B2 | 2/2003 | Baumann et al. |
| 6,531,230 | B1 | 3/2003 | Weber |
| 6,536,434 | B1 | 3/2003 | Bostock |
| 6,561,257 | B2 | 5/2003 | Huang |
| 6,568,392 | B1 | 5/2003 | Bostock |
| 6,584,976 | B2 | 7/2003 | Japuntich |
| 6,593,980 | B2 | 7/2003 | Lee |
| 6,604,524 | B1 | 8/2003 | Curran |
| 6,705,317 | B2 | 3/2004 | Castiglione |
| 6,715,489 | B2 | 4/2004 | Bostock |

(56) References Cited

U.S. PATENT DOCUMENTS

| | | | |
|---|---|---|---|
| 6,722,366 | B2 | 4/2004 | Bostock |
| 6,729,332 | B1 | 5/2004 | Castiglione |
| 6,743,464 | B1 | 6/2004 | Insley |
| 6,754,909 | B1 | 6/2004 | Samelian |
| 6,722,759 | B2 | 8/2004 | Lee |
| 6,772,759 | B2 | 8/2004 | Lee |
| 6,783,349 | B2 | 8/2004 | Neavin |
| 6,783,574 | B1 | 8/2004 | Angadjivand |
| 6,797,366 | B2 | 9/2004 | Hanson |
| 6,823,868 | B1 | 11/2004 | Begum |
| 6,824,718 | B2 | 11/2004 | Eitzman |
| 6,827,764 | B2 | 12/2004 | Springett |
| 6,843,248 | B2 | 1/2005 | Japuntich |
| 6,854,463 | B2 | 2/2005 | Japuntich |
| 6,857,428 | B2 | 2/2005 | Thornton |
| 6,883,518 | B2 | 4/2005 | Mittelstadt |
| 6,886,563 | B2 | 5/2005 | Bostock |
| 6,923,182 | B2 | 8/2005 | Angadjivand |
| 6,939,499 | B2 | 9/2005 | Merrill |
| 6,948,499 | B2 | 9/2005 | Griesbach, III |
| 6,959,709 | B2 | 11/2005 | Curran |
| 6,978,782 | B2 | 12/2005 | Tayebi |
| 6,988,500 | B1 | 1/2006 | Cox |
| 6,995,665 | B2 | 2/2006 | Appelt |
| 7,007,695 | B2 | 3/2006 | Curran |
| 7,013,895 | B2 | 3/2006 | Martin |
| 7,019,905 | B2 | 3/2006 | Weber |
| 7,028,689 | B2 | 4/2006 | Martin |
| 7,036,507 | B2 | 5/2006 | Jensen |
| 7,057,816 | B1 | 6/2006 | Allen |
| 7,069,930 | B2 | 7/2006 | Bostock |
| 7,069,931 | B2 | 7/2006 | Curran |
| 7,117,868 | B1 | 10/2006 | Japuntich |
| 7,131,442 | B1 | 11/2006 | Kronzer |
| RE39,493 | E | 2/2007 | Yuschak |
| 7,171,967 | B2 | 2/2007 | Brunell |
| 7,185,653 | B2 | 3/2007 | Lee |
| 7,188,622 | B2 | 3/2007 | Martin |
| 7,195,015 | B2 | 3/2007 | Kuriyama |
| D542,407 | S | 5/2007 | Stallard |
| 7,256,936 | B2 | 8/2007 | Hebrink |
| 7,290,545 | B2 | 11/2007 | Kleman |
| 7,302,951 | B2 | 12/2007 | Mittelstadt |
| 7,311,104 | B2 | 12/2007 | Japuntich |
| 7,316,558 | B2 | 1/2008 | Merrill |
| D567,365 | S | 4/2008 | Brunell |
| D567,937 | S | 4/2008 | Gerson |
| 7,428,903 | B1 | 9/2008 | Japuntich |
| 7,493,900 | B1 | 2/2009 | Japuntich |
| 7,503,326 | B2 | 3/2009 | Martin |
| 7,677,248 | B2 | 3/2010 | Gerson |
| 7,686,018 | B2 | 3/2010 | Cerbini |
| 7,766,015 | B2 | 8/2010 | Harold |
| 7,836,886 | B2 | 11/2010 | McDonald |
| 7,849,856 | B2 | 12/2010 | Mittelstadt |
| 7,858,163 | B2 | 12/2010 | Angadjivand |
| 7,905,973 | B2 | 3/2011 | Stelter |
| D637,711 | S | 5/2011 | Facer |
| 7,963,284 | B2 | 6/2011 | Thornton |
| 8,029,723 | B2 | 10/2011 | Angadjivand |
| 8,061,356 | B2 | 11/2011 | Bowen |
| 8,066,006 | B2 | 11/2011 | Daugaard |
| 8,074,660 | B2 | 12/2011 | Duffy |
| 8,091,550 | B2 | 1/2012 | Steindorf |
| 8,118,026 | B2 | 2/2012 | Gebrewold |
| 8,146,594 | B2 | 4/2012 | Bostock |
| 8,171,933 | B2 | 5/2012 | Xue |
| 8,225,792 | B2 | 7/2012 | Kuriyama |
| 8,276,586 | B2 | 10/2012 | Hustveit |
| 8,342,180 | B2 | 1/2013 | Martin |
| 8,360,067 | B2 | 1/2013 | Duffy |
| D676,527 | S | 2/2013 | Xue |
| 8,365,771 | B2 | 2/2013 | Xue |
| 8,375,950 | B2 | 2/2013 | Bostock |
| 8,430,100 | B2 | 4/2013 | Reese |
| 8,439,038 | B2 | 5/2013 | Steindorf |
| 8,496,005 | B2 | 7/2013 | McDonald |
| 8,512,434 | B2 | 8/2013 | Stelter |
| 8,573,217 | B2 | 11/2013 | Todd |
| 8,578,515 | B1 | 11/2013 | Petersen |
| 8,580,182 | B2 | 11/2013 | Angadjivand |
| 8,622,059 | B2 | 1/2014 | Kleman |
| 8,640,704 | B2 | 2/2014 | Spoo |
| 8,646,449 | B2 | 2/2014 | Bowsher |
| 8,757,156 | B2 | 6/2014 | Martin |
| 8,792,165 | B2 | 7/2014 | Merrill |
| 8,839,815 | B2 | 9/2014 | Young |
| 8,879,151 | B2 | 11/2014 | Merrill |
| 8,910,663 | B2 | 12/2014 | Kern |
| 8,975,011 | B2 | 3/2015 | Dunn |
| 8,975,012 | B2 | 3/2015 | Dunn |
| 8,982,462 | B2 | 3/2015 | Merrill |
| 9,012,013 | B2 | 4/2015 | Duffy |
| 9,019,607 | B2 | 4/2015 | Merrill |
| 9,081,147 | B2 | 7/2015 | Merrill |
| 9,097,858 | B2 | 8/2015 | Merrill |
| 9,101,956 | B2 | 8/2015 | Merrill |
| D746,974 | S | 1/2016 | Ylitalo |
| 9,247,775 | B2 | 2/2016 | Suzuki |
| 9,289,568 | B2 | 3/2016 | Dhuper |
| 9,291,757 | B2 | 3/2016 | Merrill |
| 9,375,544 | B2 | 6/2016 | Todd |
| 9,423,545 | B2 | 8/2016 | Merrill |
| 9,498,592 | B2 | 11/2016 | Dhuper |
| 9,616,256 | B2 | 4/2017 | McDonald |
| 9,642,403 | B2 | 5/2017 | Welch |
| 9,651,725 | B2 | 5/2017 | Merrill |
| 9,651,726 | B2 | 5/2017 | Merrill |
| 9,770,057 | B2 | 9/2017 | Duffy |
| 9,770,058 | B2 | 9/2017 | Angadjivand |
| 9,770,611 | B2 | 9/2017 | Facer |
| 9,810,930 | B2 | 11/2017 | Merrill |
| 9,907,922 | B2 | 3/2018 | Stephenson |
| 9,907,923 | B2 | 3/2018 | Stephenson |
| 9,939,560 | B2 | 4/2018 | Merrill |
| 9,950,130 | B2 | 4/2018 | Stephenson |
| 9,964,677 | B2 | 5/2018 | Merrill |
| 10,034,992 | B2 | 7/2018 | Schnell |
| 10,052,451 | B2 | 8/2018 | Dhuper |
| 10,137,321 | B2 | 11/2018 | Martin |
| 10,182,603 | B2 | 1/2019 | Duffy |
| 10,245,405 | B2 | 4/2019 | Todd |
| 10,525,228 | B2 | 1/2020 | Dhuper |
| 10,602,785 | B2 | 3/2020 | Duffy |
| 10,827,787 | B2 | 11/2020 | Facer |
| 10,863,784 | B2 | 12/2020 | Abdulqader |
| 10,905,903 | B2 | 2/2021 | Martin |
| 10,964,155 | B2 | 3/2021 | Stephenson |
| 11,065,412 | B2 | 7/2021 | Stephenson |
| 11,083,916 | B2 | 8/2021 | Duffy |
| 11,116,998 | B2 | 9/2021 | Duffy |
| 11,213,080 | B2 | 1/2022 | Henderson |
| 11,413,481 | B2 * | 8/2022 | Henderson ............. A62B 18/10 |
| 2002/0056450 | A1 | 5/2002 | Lee |
| 2004/0040562 | A1 | 3/2004 | Brunell |
| 2004/0055605 | A1 | 3/2004 | Griesbach, III |
| 2004/0226563 | A1 | 11/2004 | Xu |
| 2004/0261795 | A1 | 12/2004 | Brunell |
| 2005/0001728 | A1 | 1/2005 | Appelt |
| 2005/0098180 | A1 | 5/2005 | Lien |
| 2006/0174890 | A1 | 8/2006 | Cheng |
| 2007/0068529 | A1 | 3/2007 | Kalatoor |
| 2007/0078528 | A1 | 4/2007 | Anke |
| 2007/0107734 | A1 | 5/2007 | Brunell |
| 2007/0119459 | A1 | 5/2007 | Japuntich |
| 2007/0157932 | A1 | 7/2007 | Cerbini |
| 2007/0175477 | A1 | 8/2007 | Baggett |
| 2007/0272248 | A1 | 11/2007 | Lin |
| 2007/0283964 | A1 | 12/2007 | Gorman |
| 2008/0044811 | A1 | 2/2008 | Haugland et al. |
| 2008/0105261 | A1 | 5/2008 | Harold |
| 2008/0178884 | A1 | 7/2008 | Gerson |
| 2009/0078264 | A1 | 3/2009 | Martin |
| 2009/0078265 | A1 | 3/2009 | Gebrewold |

(56) References Cited

U.S. PATENT DOCUMENTS

| | | | |
|---|---|---|---|
| 2009/0235934 | A1 | 9/2009 | Martin |
| 2009/0255542 | A1 | 10/2009 | Ugai |
| 2010/0065058 | A1 | 3/2010 | Ungar |
| 2010/0126510 | A1 | 5/2010 | Gerson |
| 2010/0132713 | A1 | 6/2010 | Gerson |
| 2011/0155138 | A1 | 6/2011 | Lin |
| 2011/0180078 | A1 | 7/2011 | McKinley |
| 2012/0000473 | A1 | 1/2012 | Shigematsu |
| 2012/0012177 | A1 | 1/2012 | Muduli |
| 2012/0090615 | A1 | 4/2012 | Chen |
| 2012/0125341 | A1 | 5/2012 | Gebrewold |
| 2012/0167890 | A1 | 7/2012 | Insley |
| 2012/0167891 | A1 | 7/2012 | Smaller |
| 2014/0034059 | A1 | 2/2014 | Yagi |
| 2014/0135668 | A1 | 5/2014 | Belalcazar |
| 2014/0202469 | A1 | 7/2014 | Smaller |
| 2014/0326245 | A1 | 11/2014 | Teng |
| 2014/0326255 | A1 | 11/2014 | Teng |
| 2015/0059773 | A1 | 3/2015 | Duffy |
| 2015/0101617 | A1 | 4/2015 | Duffy |
| 2015/0328421 | A1 | 11/2015 | Stephenson |
| 2017/0031161 | A1 | 11/2017 | Henderson |
| 2017/0318875 | A1 | 11/2017 | Henderson |
| 2017/0340031 | A1 | 11/2017 | Henderson |
| 2018/0104014 | A1 | 4/2018 | Heindl |
| 2018/0154195 | A1 | 6/2018 | Henderson |
| 2018/0272161 | A1 | 9/2018 | Henderson |
| 2019/0184126 | A1 | 6/2019 | Todd |
| 2021/0015184 | A1 | 1/2021 | Facer |
| 2021/0113859 | A1 | 4/2021 | Martin |
| 2021/0331008 | A1 | 10/2021 | Duffy |

FOREIGN PATENT DOCUMENTS

| | | |
|---|---|---|
| CN | 201543133 | 11/2009 |
| CN | 201550643 | 8/2010 |
| CN | 201551752 | 8/2010 |
| CN | 201967734 | 9/2011 |
| CN | 202456521 | 10/2012 |
| CN | 202552239 | 11/2012 |
| CN | 202588368 | 12/2012 |
| CN | 202618364 | 12/2012 |
| EP | 0814871 | 1/2002 |
| EP | 0814871 B1 | 1/2002 |
| EP | 2486815 | 8/2012 |
| EP | 3226707 | 6/2019 |
| FR | 2621459 | 12/1990 |
| FR | 2889916 | 8/2006 |
| GB | 2433701 | 3/2010 |
| JP | 8332239 | 12/1996 |
| JP | 3045995 | 8/1997 |
| JP | 9-239050 | 9/1997 |
| JP | 3072027 | 9/2000 |
| JP | 2001-000565 | 1/2001 |
| JP | 2001-161843 | 6/2001 |
| JP | 2001-204833 | 7/2001 |
| JP | 2003-047688 | 2/2003 |
| JP | 2003-236000 | 8/2003 |
| JP | 2003-265635 | 9/2003 |
| JP | 3101352 | 10/2003 |
| JP | 2004-173777 | 6/2004 |
| JP | 3101212 | 6/2004 |
| JP | 2005-013492 | 1/2005 |
| JP | 2005-034618 | 2/2005 |
| JP | 3108880 | 4/2005 |
| JP | 2005-348998 | 12/2005 |
| JP | 2006-314618 | 11/2006 |
| JP | 2006-320629 | 11/2006 |
| JP | 2007-54270 | 3/2007 |
| JP | 2010279637 | 12/2010 |
| JP | 3167135 | 1/2011 |
| JP | 2012-232080 | 5/2011 |
| KR | 20-2000-0004542 | 3/2000 |
| TW | M435859 | 8/2012 |
| TW | 201318666 | 5/2013 |
| WO | WO 2016/090067 | 6/2016 |
| WO | WO 2016-090082 | 6/2016 |

OTHER PUBLICATIONS

Davies, "The Separation of Airborne Dust Particles", Proceedings of the Institution of Mechanical Engineers 1B, 1953, pp. 185-213.

Galemed Oxi.Plust™ Oxygen Mask [retrieved from internet on Jul. 24, 2017] http://www.medicalexpo.com/prod/galemed-corporation/product-68550-774148.html#product-item_510581.

"Honeywell SAF-T-FIT Plus Disp. N95 Particulate Respirator Boomerang Nose Seal—Molded Cup-Valve-OV", [retrieved from the internet on Jul. 18, 2017], URL<https://www.fullsource.com/honeywell-n1125ov/>, 3 pgs.

External definition, Merriam Webster Online Dictionary, definition 1, https://www.merriam-webster.com/dictionary/external (Year 2020).

Interior definition, Merriam Webster Online Dictionary, definition 1, https://www.merriam-webster.com/dictionary/interior (Year 2020).

"Respiratory Safety", Protective Industrial Products, [retrieved from the internet on Jun. 29, 2017], URL <http://www.pipusa.com/en/products/?scID=2566&ccID=11571&sID=27955&ssID=79604&pID=47677>, p. 1.

Wente, "Manufacture of Super Fine Organic Fibers", Report No. 4364, Navel Research Laboratories, May 25, 1954, 24pgs.

Wente, "Superfine Thermoplastic Fibers", Industrial Engineering Chemistry, 1956, vol. 48, pp. 1342-1346.

International Search Report for PCT International Application No. PCT/US2016/031434, mailed on Aug. 11, 2016, 5 pages.

* cited by examiner

RESPIRATOR TAB

FIELD OF THE INVENTION

The present invention relates to personal respiratory protection devices, known as respirators or face masks, which are capable of being folded flat during storage and forming a cup-shaped air chamber over the mouth and nose of a wearer during use.

BACKGROUND OF THE INVENTION

Filtration respirators or face masks are used in a wide variety of applications when it is desired to protect a human's respiratory system from particles suspended in the air or from unpleasant or noxious gases. Generally such respirators or face masks may come in a number of forms, but the two most common are a molded cup-shaped form or a flat-folded form. The flat-folded form has advantages in that it can be carried in a wearer's pocket until needed and re-folded flat to keep the inside clean between wearings.

Such respiratory devices include, for example, respirators, surgical masks, clean room masks, face shields, dust masks, breath warming masks, and a variety of other face coverings.

Flat-fold respirators are typically formed from a sheet filter media which removes the suspended particles from the air prior to inhalation by the user. Performance of the respirator is therefore reliant on minimizing the flow of air that bypasses the filter medium prior to inhalation. It is recognized that the primary route for bypass air is between the respirator and the face of the user. It is therefore imperative to provide a close fit between the respirator and the face in order to minimize the bypass airflow. This is particularly challenging in the region of the nose of the user given the protrusion of the nose from the face and the ergonomic variations in the size and shape of the nose of different users.

Flat-fold respirators are typically formed from a sheet filter medium which is folded or joined to form two or more panels. The panels are opened out prior to or during the donning process to form the air chamber. Often an exhalation valve is provided on one of the panels in order to reduce the respiratory effort of exhaling.

For example, US 2008/271740 A1 Gloag et. al.) discloses a respirator that has a mask body that has a plurality of panels that can fold in towards each other and that can unfold into open in-use configuration. At least one of the panels has a tab that assists in opening the mask body from its folded configuration into its open in-use configuration. The use of the tab on the panel(s) of the multi-paneled mask body allows for easier donning and doffing and reduces the opportunity for contaminants to get into the mask interior when the mask is being opened by the user.

The earlier filed, but later published patent application WO 2016/090082 discloses a personal respiratory protection device comprising an upper panel, a central panel, and a lower panel, the central panel being separated from each of the upper and lower panels by a first and second fold, seam, weld or bond, respectively, such that device is capable of being folded flat for storage along the first and second fold, seam, weld or bond and opened to form a cup-shaped air chamber over the nose and mouth of the wearer when in use, wherein the upper panel has a nose conforming element for conforming at least part of the upper panel to the nose of a wearer when in use, the nose conforming element having a resiliently flexible central portion and first and second rigid outer portions extending outwardly from the central portion, the central portion deforming upon donning of the respirator so that the central and outer portions conform to the profile of the nose.

It is common for the user of the respirator to be wearing additional safety equipment such as goggles, gloves or protective clothing. This can impair the ability of the user to efficiently don the respirator. This can reduce the effectiveness of the respirator due to impaired fit or comfort.

It is also recognized that at times the user holds the outer edges of the respirator during the donning procedure. This causes the user to touch the inside surface of the respirator. This can be disadvantageous in certain environments such as surgical use.

Furthermore, it is recognized that the adequate opening of the respirator prior to donning affects the ease of donning and the perceived comfort of the wearer once the respirator is in position. There is therefore a perceived need to improve the ease of opening and donning of the respirator. Similarly there is a perceived need to reduce the likelihood that the internal surface of the respirator is handled during the donning and doffing the respirator.

One factor which affects the ease of donning of a respirator is the requirement to deform a malleable nose clip to the shape of the nose prior to and/or during the donning of the respirator. This operation can be particularly challenging if the user is wearing gloves or other protective clothing.

It is an object of the present invention to at least mitigate the above problems by providing a personal respiratory protection device which opens effectively and is easier to open and don.

STATEMENTS OF INVENTION

Accordingly, the invention provides personal respiratory protection device comprising: an upper panel, a central panel, and a lower panel, the central panel being separated from each of the upper and lower panels by a first and second fold, seam, weld or bond, respectively, such that device is capable of being folded flat for storage along the first and second fold, seam, weld or bond and opened to form a cup-shaped air chamber over the nose and mouth of the wearer when in use, wherein the upper panel has a graspable upper tab, the upper tab being graspable in use to open the device.

Advantageously, the provision of a graspable tab attached to the upper panel enables the user to open the respirator prior to donning without making contact with the inside surface of the respirator.

The upper tab is moveable between a stowed position in which the tab rests against the upper panel and a deployed position in which the upper tab projects away from the upper panel.

This feature has the advantage that the upper tab can be in an optimal position during donning and during use. During donning the tab projects away from the upper panel to promote ease of access for the user. This is particularly advantageous in the event that the user is wearing gloves or other protective clothing. Once the device is donned the upper tab can be stowed against the upper panel thereby moving the tab out of the line of sight of the user.

Preferably, the upper tab remains in the deployed position until such time as it is returned to the stowed position.

Preferably, the upper tab folds about a line of attachment to the upper panel when moving between the stowed and deployed positions.

Preferably, the device includes a nose clip for conforming to the nose of a user, the line of attachment of the upper tab being proximate the nose clip such that the upper tab acts on the nose clip to deform the nose clip during opening of the mask.

Advantageously, this feature ensures that the nose clip adopts a shape that approximates the profile of the nose before the mask is applied to the face. This increases the likelihood of achieving a close fit between the mask and the face.

Preferably, the upper tab is positioned on a longitudinal centerline of the device.

Preferably, wherein the upper tab has a length of between 25 mm and 35 mm, most preferably 30 mm.

Preferably, the upper tab has a width of between 25 mm and 35 mm, preferably 30 mm.

Preferably, the lower panel has a graspable lower tab attached to an interior portion of an external surface of the lower panel, the lower tab being graspable in use in conjunction with the upper tab to open the device Preferably, lower panel has a lateral storage fold when stored, the fold extending through the interior section, wherein the lower tab is attached to the lower panel at a position proximate the lateral storage fold.

Preferably the lower tab is positioned within 10 mm above or below the lateral fold.

Preferably, the lower tab is positioned on the lateral fold.

Preferably, the lower tab is between 10 mm and 40 mm in width at its point of attachment to the lower panel, preferably 15 mm.

Preferably, the lower tab is positioned on a longitudinal centerline of the device.

Preferably, at least a portion of the lower tab is visible to a user when the device is folded.

Preferably, the lower panel is folded to form the lateral fold at a position approximately equidistant between the second fold, seam, weld or bond and a lower outer periphery of the lower panel.

Preferably, the device has a multi-layered structure that comprises a first inner cover web, a filtration layer that comprises a web that contains electrically-charged microfibers, and a second outer cover web, the first and second cover webs being disposed on first and second opposing sides of the filtration layer, respectively, wherein the nose conforming element is attached to the second cover web.

Preferably, the personal respiratory protection device comprises a resiliently compliant headband secured to the central panel.

Preferably, the personal respiratory protection device further comprises an exhalation valve disposed on the central panel.

DETAILED DESCRIPTION OF THE INVENTION

The invention will now be described, by way of example only, in which.

Figure 1:
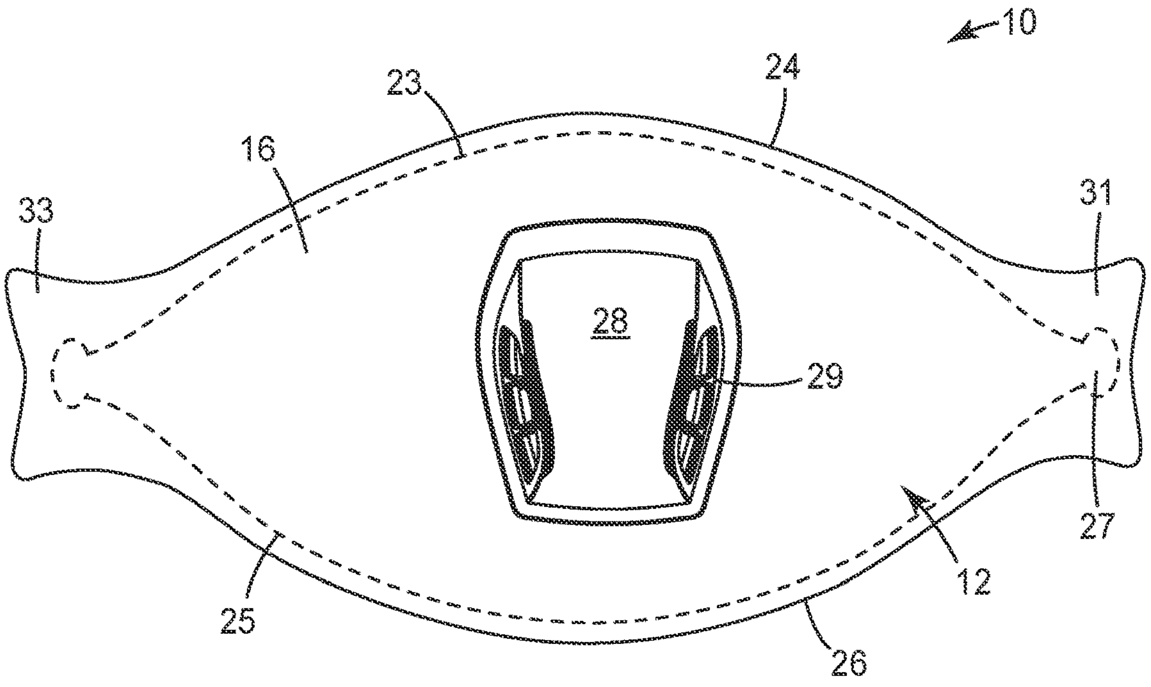
FIG. 1 is a front view of a personal respiratory protection device of the current invention in its flat-fold configuration.
Figure 2:
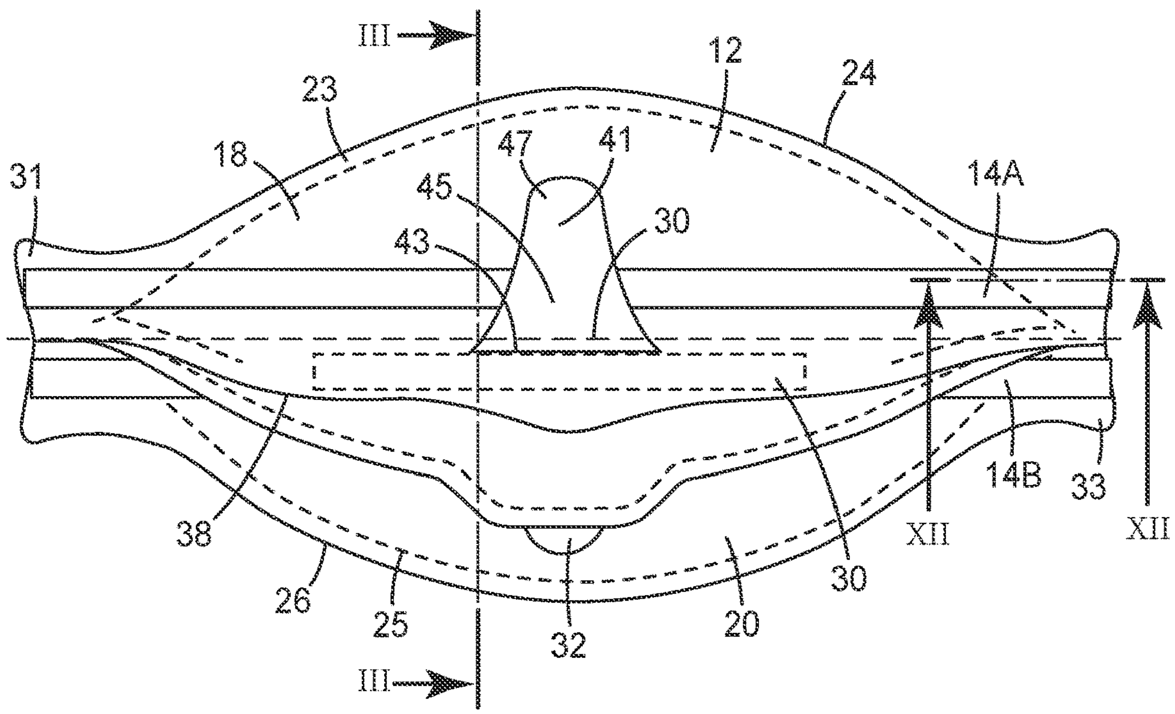
FIG. 2 is a rear view of the personal respiratory protection device of FIG. 1 in its flat-fold configuration.
Figure 3:
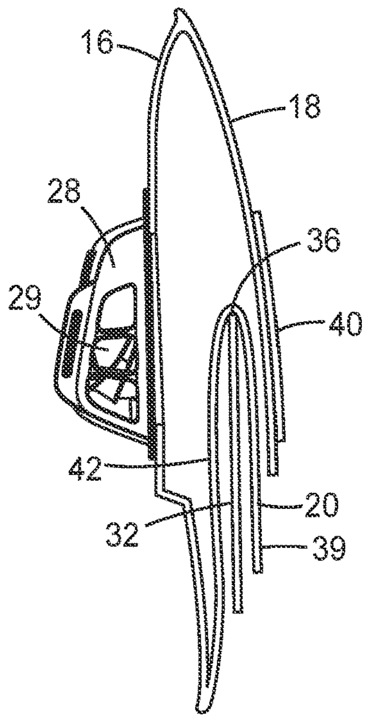
FIG. 3 is a cross-section of the personal respiratory protection device shown in FIG. 1 taken along line III-III in FIG. 2.
Figure 12:
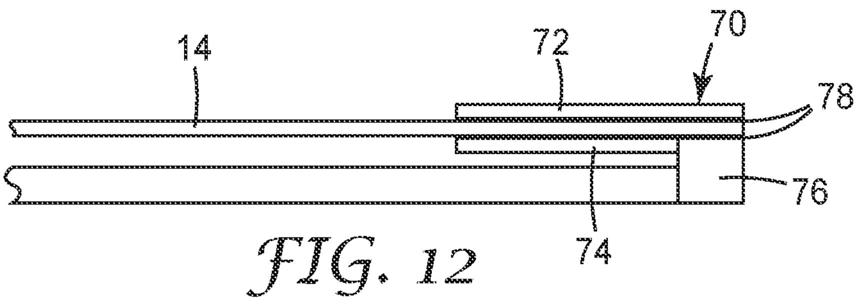
FIG. 12 is a detailed cross-sectional view of part of the personal respiratory protection device of FIG. 1 taken along line XI-XI in FIG. 2 and showing attachment of the headband to the main body with the device in its flat-fold configuration.
Figure 13:
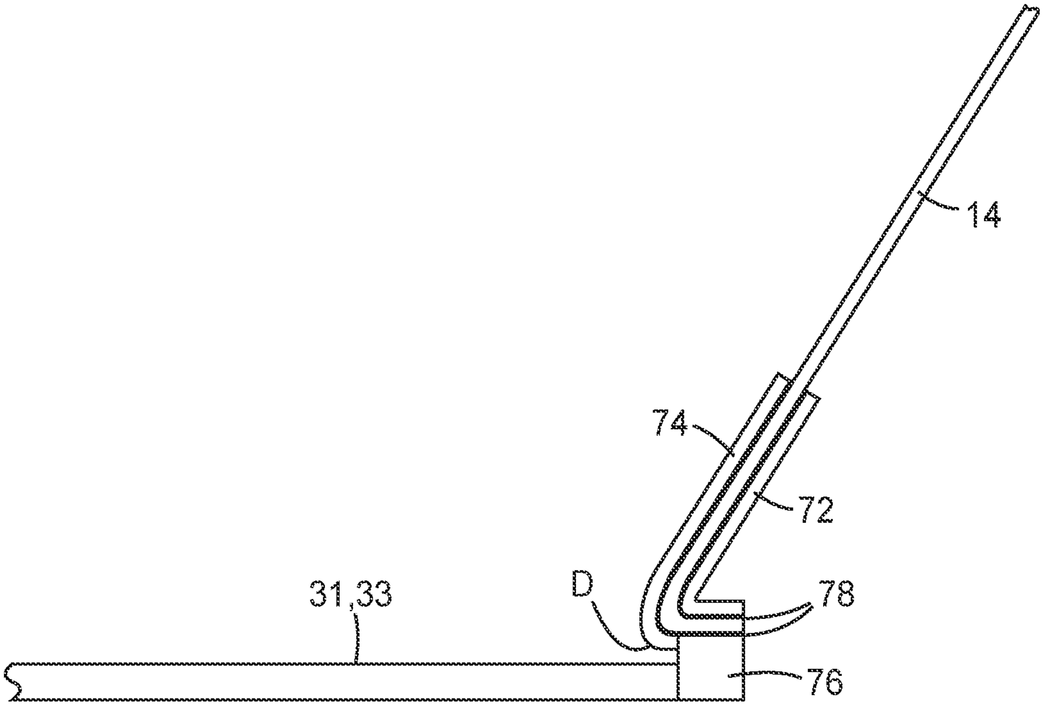

FIG. 13 is a detailed cross-sectional view of part of the personal respiratory protection device of FIG. 1 taken similar to FIG. 12 and showing attachment of the headband to the main body with the device in its open configuration, and FIG. 1 shows a personal respiratory protection device in the form of a respirator (also commonly referred to as a mask) indicated generally at 10. The respirator 10 is a flat-fold respirator which is shown in FIGS. 1 to 3 in its stored (also known as flat-fold or flat-folded) configuration. In this configuration the respirator is substantially flat so that it may be readily stored in the pocket of a user.

The respirator 10 has a main body indicated generally at 12 and a headband 14 formed of two sections 14A, 14B. The main body 12 has a central panel 16, an upper panel 18 and a lower panel 20. In use, the upper panel 18 and lower panel 20 are opened outwardly from the central panel 16 to form a cup-shaped chamber 22 (shown in FIG. 6). Once opened, the respirator is then applied to the face as will be described in further detail shortly.

The respirator 10 is formed from folded and welded portions of multi-layered filter material to form three portions or panels, as will be discussed in further detail below. The respirator 10 has a multi-layered structure that comprises a first inner cover web, a filtration layer that comprises a web that contains electrically-charged microfibers, and a second outer cover web, the first and second cover webs being disposed on first and second opposing sides of the filtration layer, respectively.

The filter material may be comprised of a number of woven and nonwoven materials, a single or a plurality of layers, with or without an inner or outer cover or scrim. Preferably, the central panel 16 is provided with stiffening means such as, for example, woven or nonwoven scrim, adhesive bars, printing or bonding. Examples of suitable filter material include microfiber webs, fibrillated film webs, woven or nonwoven webs (e.g., airlaid or carded staple fibers), solution-blown fiber webs, or combinations thereof. Fibers useful for forming such webs include, for example, polyolefins such as polypropylene, polyethylene, polybutylene, poly(4-methyl-1-pentene) and blends thereof, halogen substituted polyolefins such as those containing one or more chloroethylene units, or tetrafluoroethylene units, and which may also contain acrylonitrile units, polyesters, polycarbonates, polyurethanes, rosin-wool, glass, cellulose or combinations thereof.

Fibers of the filtering layer are selected depending upon the type of particulate to be filtered. Proper selection of fibers can also affect the comfort of the respiratory device to the wearer, e.g., by providing softness or moisture control. Webs of melt blown microfibers useful in the present invention can be prepared as described, for example, in Wente, Van A., "Superfine Thermoplastic Fibers" in Industrial Engineering Chemistry, Vol. 48, 1342 et seq. (1956) and in Report No. 4364 of the Navel Research Laboratories, published May 25, 1954, entitled "Manufacture of Super Fine Organic Fibers" by Van A. Wente et al. The blown microfibers in the filter media useful on the present invention preferably have an effective fiber diameter of from 3 to 30 micrometers, more preferably from about 7 to 15 micrometers, as calculated according to the method set forth in Davies, C. N., "The Separation of Airborne Dust Particles", Institution of Mechanical Engineers, London, Proceedings 1B, 1952.

Staple fibers may also, optionally, be present in the filtering layer. The presence of crimped, bulking staple fibers provides for a more lofty, less dense web than a web consisting solely of blown microfibers. Preferably, no more than 90 weight percent staple fibers, more preferably no more than 70 weight percent are present in the media. Such webs containing staple fiber are disclosed in U.S. Pat. No. 4,118,531 (Hauser).

Bicomponent staple fibers may also be used in the filtering layer or in one or more other layers of the filter media. The bicomponent staple fibers which generally have an outer layer which has a lower melting point than the core portion can be used to form a resilient shaping layer bonded together at fiber intersection points, e.g., by heating the layer so that the outer layer of the bicomponent fibers flows into contact with adjacent fibers that are either bicomponent or other staple fibers. The shaping layer can also be prepared with binder fibers of a heat-flowable polyester included together with staple fibers and upon heating of the shaping layer the binder fibers melt and flow to a fiber intersection point where they surround the fiber intersection point. Upon cooling, bonds develop at the intersection points of the fibers and hold the fiber mass in the desired shape. Also, binder materials such as acrylic latex or powdered heat actuable adhesive resins can be applied to the webs to provide bonding of the fibers.

Electrically charged fibers such as are disclosed in U.S. Pat. No. 4,215,682 (Kubik et al.), U.S. Pat. No. 4,588,537 (Klasse et al.) or by other conventional methods of polarizing or charging electrets, e.g., by the process of U.S. Pat. No. 4,375,718 (Wadsworth et al.), or U.S. Pat. No. 4,592,815 (Nakao), are particularly useful in the present invention. Electrically charged fibrillated-film fibers as taught in U.S. Pat. No. RE. 31,285 (van Turnhout), are also useful. In general the charging process involves subjecting the material to corona discharge or pulsed high voltage.

Sorbent particulate material such as activated carbon or alumina may also be included in the filtering layer. Such particle-loaded webs are described, for example, in U.S. Pat. No. 3,971,373 (Braun), U.S. Pat. No. 4,100,324 (Anderson) and U.S. Pat. No. 4,429,001 (Kolpin et al.). Masks from particle loaded filter layers are particularly good for protection from gaseous materials.

At least one of the central panel 16, upper panel 18 and lower panel 20 of the respiratory device of the present invention must comprise filter media. Preferably at least two of the central panel 16, upper panel 18 and lower panel 20 comprise filter media and all of the central panel 16, upper panel 18 and lower panel 20 may comprise filter media. The portion(s) not formed of filter media may be formed of a variety of materials. The upper panel 18 may be formed, for example, from a material which provides a moisture barrier to prevent fogging of a wearer's glasses. The central panel 16 may be formed of a transparent material so that lip movement by the wearer can be observed.

The central panel 16 has a curvilinear upper peripheral edge 24 which is coexistent with an upper bond 23 between the central panel 16 and the upper portion 18. A curvilinear lower peripheral edge 26 is coexistent with a lower bond 25 between the central panel 16 and the lower panel 20. The bonds 23, 25 take the form of ultrasonic welds but may alternatively be folds in the filter material or alternative methods of bonding. Such alternative bonds may take the form of adhesive bonding, stapling, sewing, thermomechanical connection, pressure connection, or other suitable means and can be intermittent or continuous. Any of these welding or bonding techniques leaves the bonded area somewhat strengthened or rigidified.

The bonds 23, 25 form a substantially airtight seal between the central panel 16 and the upper and lower panels 18, 20, respectively and extend to the longitudinal edges 27 of the respirator where the central upper, lower panels 16, 18, 20 collectively form headband attachment portions in the form of lugs 31, 33. The central panel 16 carries an exhalation valve 28 which reduces the pressure drop across the filter material when the user exhales.

The upper portion 18 carries a graspable upper tab 41 (referred to from herein as the upper tab 41) which assists in the opening and donning of the respirator as will be described in further detail below. The upper tab 41 has a base section 45 and a tip section 47. The tab 41 is attached to the upper panel 18 along a line of attachment 43 by way of an ultrasonic weld or adhesive bond. The upper tab 41 is shown in FIG. 2 in its stowed position in which tip section 47 rests against the upper portion 18. The upper tab 41 is position on a longitudinal centerline C-C of the device 10 and has a length along that centerline of between 25 mm and 35 mm, but preferably 30 mm. The length of the line of attachment 43 is also between 25 mm and 35 mm, but preferably 30 mm. The upper tab 41 is formed from 150 gsm Daltex Polypropylene spunbond material from Don&Low.

The line of attachment of the upper tab 41 is coexistent with a malleable nose clip 30 of known construction. The nose clip 30 is positioned beneath the cover web to allow for the welding or bonding of the upper tab 41 to the outer surface of the cover web. The positioning of the line of attachment 43 adjacent the nose clip 30 allows the upper tab 41 to act directly on the nose clip 30 during donning as will be described in further detail below.

Figure 7:
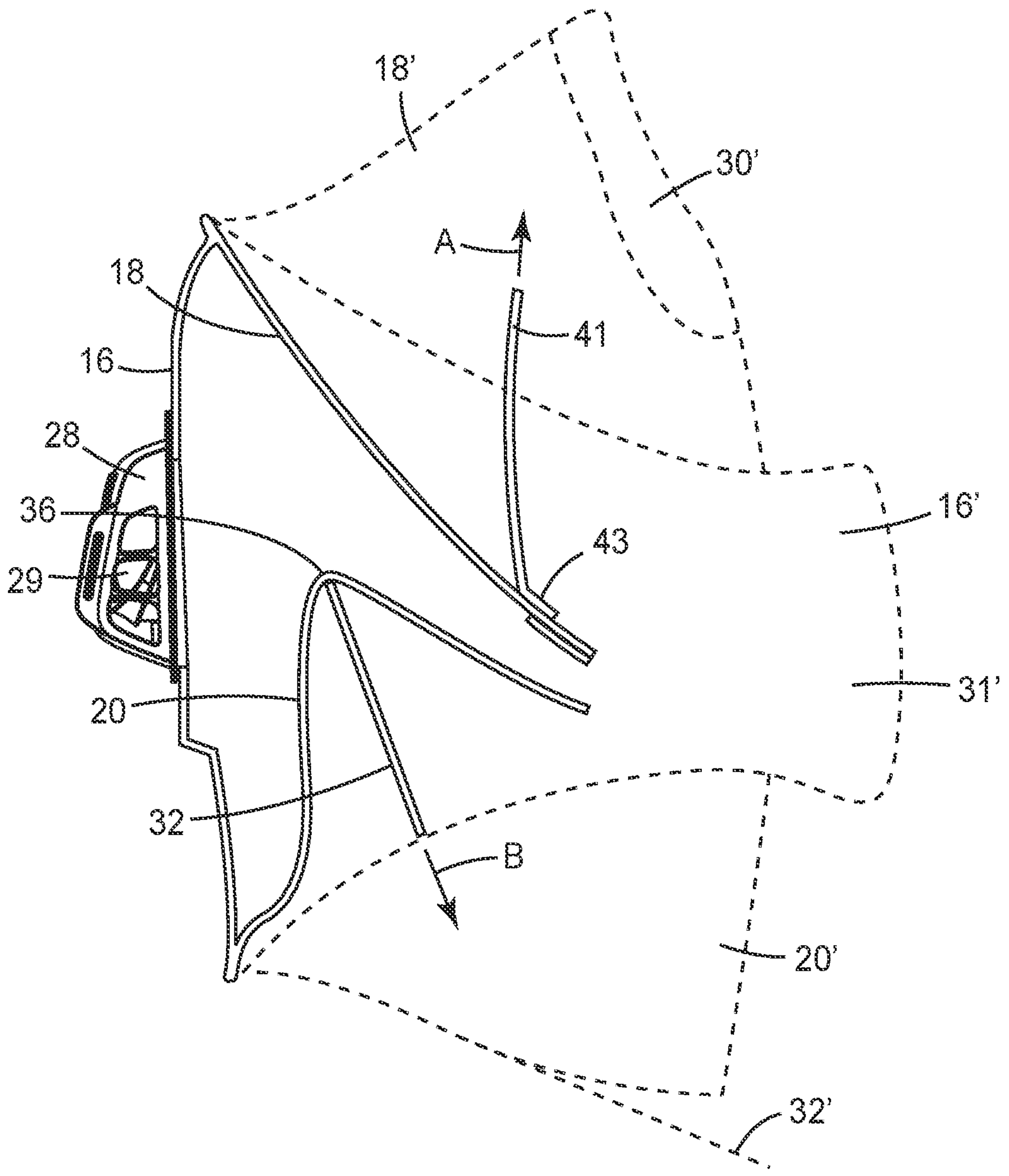
FIG. 7 is a cross-sectional view of the personal respiratory protection device of FIG. 1 shown in its intermediate configuration with the open configuration non-cross-sectioned side view shown in dotted lines.

In use the nose clip 30 conforms to the face of the user to improve the seal formed between the respirator 10 and the face of the user. The nose clip 30 is arranged centrally at the upper outer periphery 38 of the upper portion 18. The nose clip 30 operates in conjunction with a nose pad 35 which is shown in FIG. 7 to be located on the inside of the upper panel 18 and serves the purpose of softening the point of contact between the nose and the upper panel 18.

Figure 6:
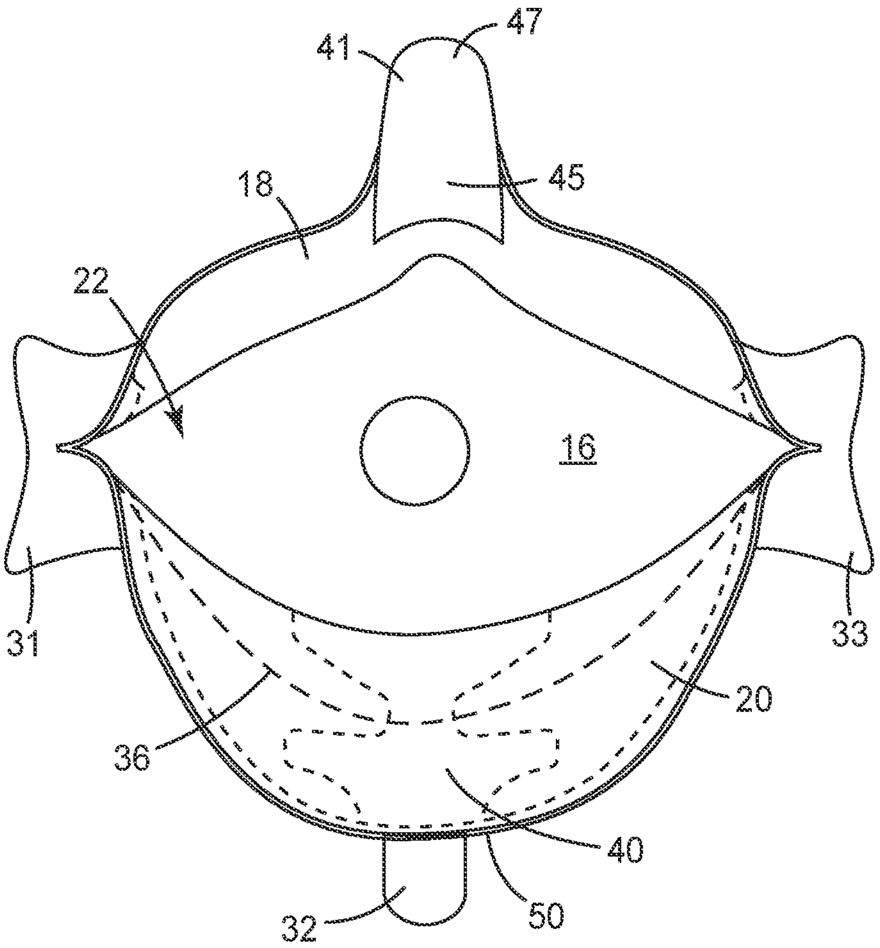
FIG. 6 is a rear view of the personal respiratory protection device of FIG. 1 shown in its open configuration.

Turning now to FIG. 3, the arrangement of the features of the respirator 10 in its stored configuration is shown in greater detail. The upper tab 41 is shown positioned on the outer surface of the upper panel 18. The upper panel 18 is shown at the rearward side of the folded respirator 10 overlapping the lower panel 20. The lower panel 20 is folded about a lateral fold 36 (shown as a long dotted line in FIG. 2). The lateral fold 36 divides the lower panel 20 into an outer section 40 and an inner section 42. Attached to the lower panel 20 is a graspable lower tab 32 which assists in the opening and donning of the respirator as will be described in further detail below. The lower tab 32 has a base which is attached to an interior portion of the exterior surface lower panel 20 (that is to say inwardly of a lower outer periphery 50 (as shown in FIG. 6) and the lower bond 25) at a position proximate the lateral fold 36 and ideally attached at the fold 36 as shown in FIG. 3. The positioning of the lower tab 32 may vary within 10 mm either side of the lateral fold. The width of the lower tab 32 at its point of attachment to the lower panel 20 is 15 mm although this width may vary between 10 mm and 40 mm.

Figure 4:
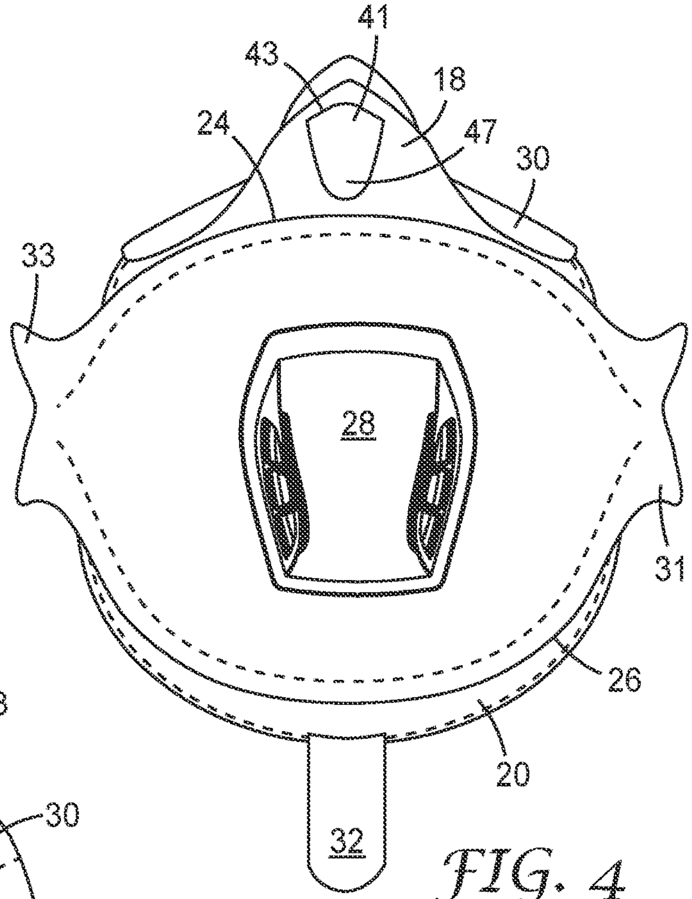
FIG. 4 is a front view of the personal respiratory protection device of FIG. 1 shown in its open configuration.
Figure 5:
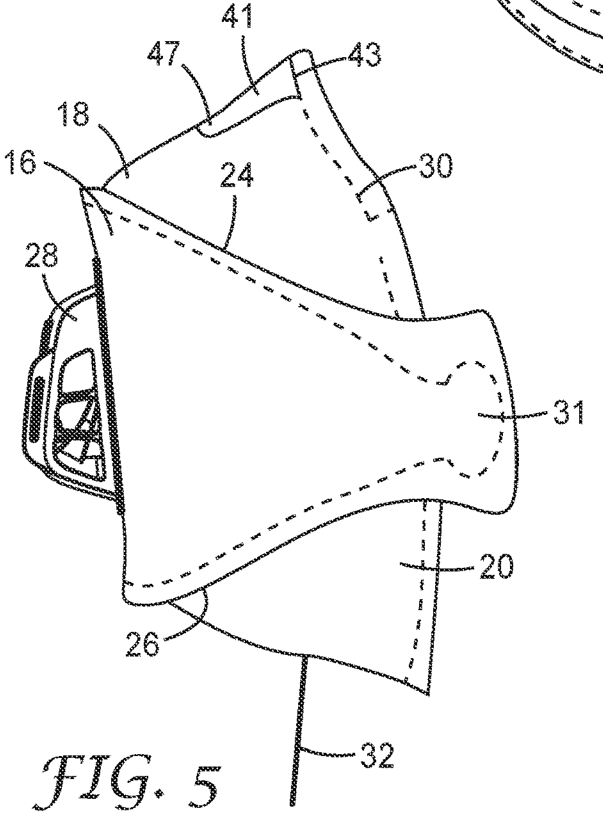
FIG. 5 is a side view of the personal respiratory protection device of FIG. 1 shown in open ready-to-use configuration.

FIGS. 4, 5 and 6 show the respirator 10 in its open configuration. In FIGS. 4 and 5 the upper tab 41 is show in its stowed position in which it rests against the upper panel 18. In FIG. 6 the upper tab 41 is in its deployed position as will be described in further detail below.

Referring in detail to FIGS. 4, 5 and 6, the central panel 16 is no longer flat as shown in FIGS. 1 to 3 but is now curved rearwardly from the valve 28 to the lugs 31, 33. The shape of this curve approximately conforms to the mouth area of the face of the user. The upper panel 18 is pivoted about the curvilinear upper peripheral edge 24 and is curved to form a peak which matches the shape of the nose of the user. Similarly, the lower panel 20 is pivoted about the curvilinear lower peripheral edge 24 to form a curve which matches the shape of the neck of the user.

The opening of the respirator 10 between the folded configuration shown in FIGS. 1 to 3 and the open configuration shown in FIGS. 4 to 6 will now be described in greater detail with reference to FIG. 7.

FIG. 7 shows a cross-section of the respirator 10 sectioned along the same line as FIG. 3 but with the respirator shown in an intermediate configuration. Dotted lines show the respirator in the open configuration for comparison.

To open and don the respirator, the user grips the upper tab 41 and moves it from its stowed position shown in FIGS. 2 to 5 by pulling the tip section of the tab 41 in direction A. This moves the tab 41 to its deployed position shown in FIGS. 6, 7 and 9. As the upper tab 41 is pulled by the user in direction A it applies a force to the malleable nose clip 30 which deforms the nose clip 30 to a shape which approximates the curve of the bridge of the nose of the user. This in turn curves the line of attachment 43 which provides sufficient curvature to the structure of the upper tab 41 to enable it to remain in the deployed position until such time as the user returns to its stowed position. At the same time the upper tab 41 acts on the upper panel 18 to open the respirator 10.

With the other hand the user takes hold of the lower tab 32 and pulls the lower tab 32 in direction B as indicated in FIG. 7 in order to apply an opening force to the valley side of the lateral fold 36. The tab may be textured to improve grip or may be coloured to better distinguish from the main body of the respirator. This opening force causes the fold 36 to move rearwardly and downwardly with respect to the central panel 16. This causes the lower panel 20 to pivot about the the curvilinear lower peripheral edge 24. Simultaneously, load is transferred from the base of the lower tab 32 to the lugs 31, 33. This pulls the lugs 31, 33 inwardly causing the central panel 16 to curve. The curvature of the central panel 16 in turn applies a load (primarily via the lugs 31, 33) to the upper portion 18. This causes the longitudinal centre of the upper portion 18 to elevate as shown in FIGS. 6 and 7.

As the user continues to pull the lower tab 32 beyond the intermediate position shown in FIG. 7 the lugs 31, 33 continue to move closer to one another as the central panel 16 become increasingly curved. This in turn causes the continued upward movement of the upper portion 18 and downward movement of the lower panel 20 towards the open position (dotted lines in FIG. 7). In this way the lower tab 32 improves the opening mechanism of the respirator by ensuring that the load applied by the user to open the respirator 10 is most effectively and efficiently deployed to open the respirator 10.

Figure 8:
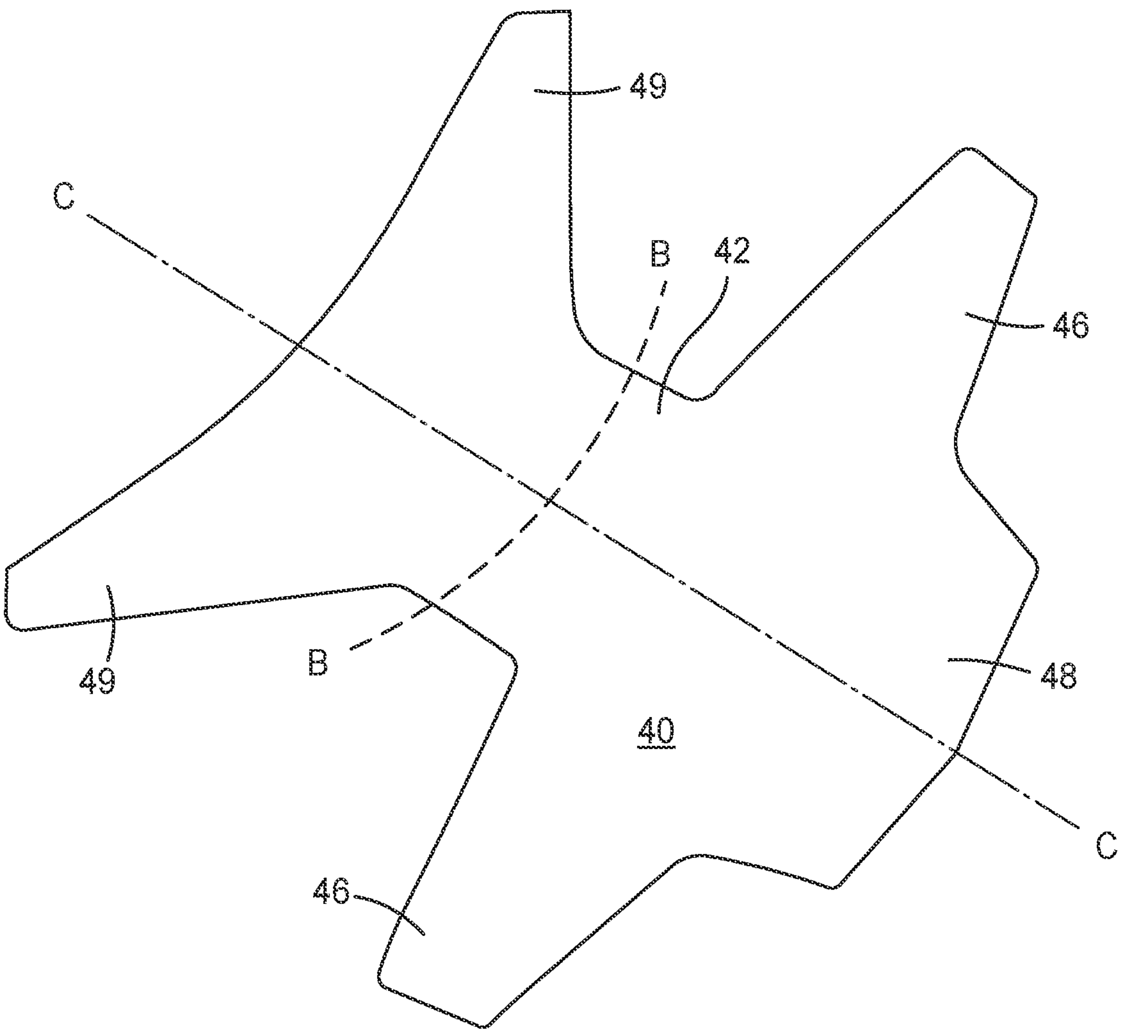
FIG. 8 is a detailed top perspective view of the stiffening panel of the respirator of FIG. 1.

The lower panel 20 is shown to include a stiffening sheet in the form of panel 40 (shown in long dotted lines). The stiffening panel 40 forms part of the multilayered filter material and is formed from material well known in the art for its stiffening properties. The stiffening panel 40 is approximately hour-glass shaped and is shown in greater detail in FIG. 8 to include a first pair of wings 42, a waist portion 44, a second pair of wings 46 and a front section 48. The front section 48 is coexistent with the lower outer periphery 50 (as shown in FIG. 6) of the lower panel 20 and the waist section is coexistent with the lateral fold 36. When the respirator 10 is in its folded configuration, the stiffening panel 40 is folded along al lateral crease indicated at line B-B. As the respirator 10 opens from the folded position as described above, the stiffening panel 40 opens out about lateral crease line B-B. As the respirator approaches the open configuration (as shown in FIGS. 4 to 6) the fold along lateral crease line B-B flattens out and the stiffening panel curves about a longitudinal crease indicated at line C-C. The curving of the panel 40 along longitudinal crease line C-C prevents the folding about lateral crease line B-B which gives the stiffening panel 40 and thereby lower panel 20 additional rigidity. This additional rigidity is at least in part imparted by the stiffening sheet 40 folding about longitudinal crease line C-C as the respirator 10 opens from a concave external angle to a convex external angle, that is to say a mountain fold is formed when the fold goes overcentre about the longitudinal crease line C-C. This in turn helps to prevent the collapse of the lower panel 20 and thus improves the conformity of the lower panel 20 to the chin area of the face.

Figure 9:
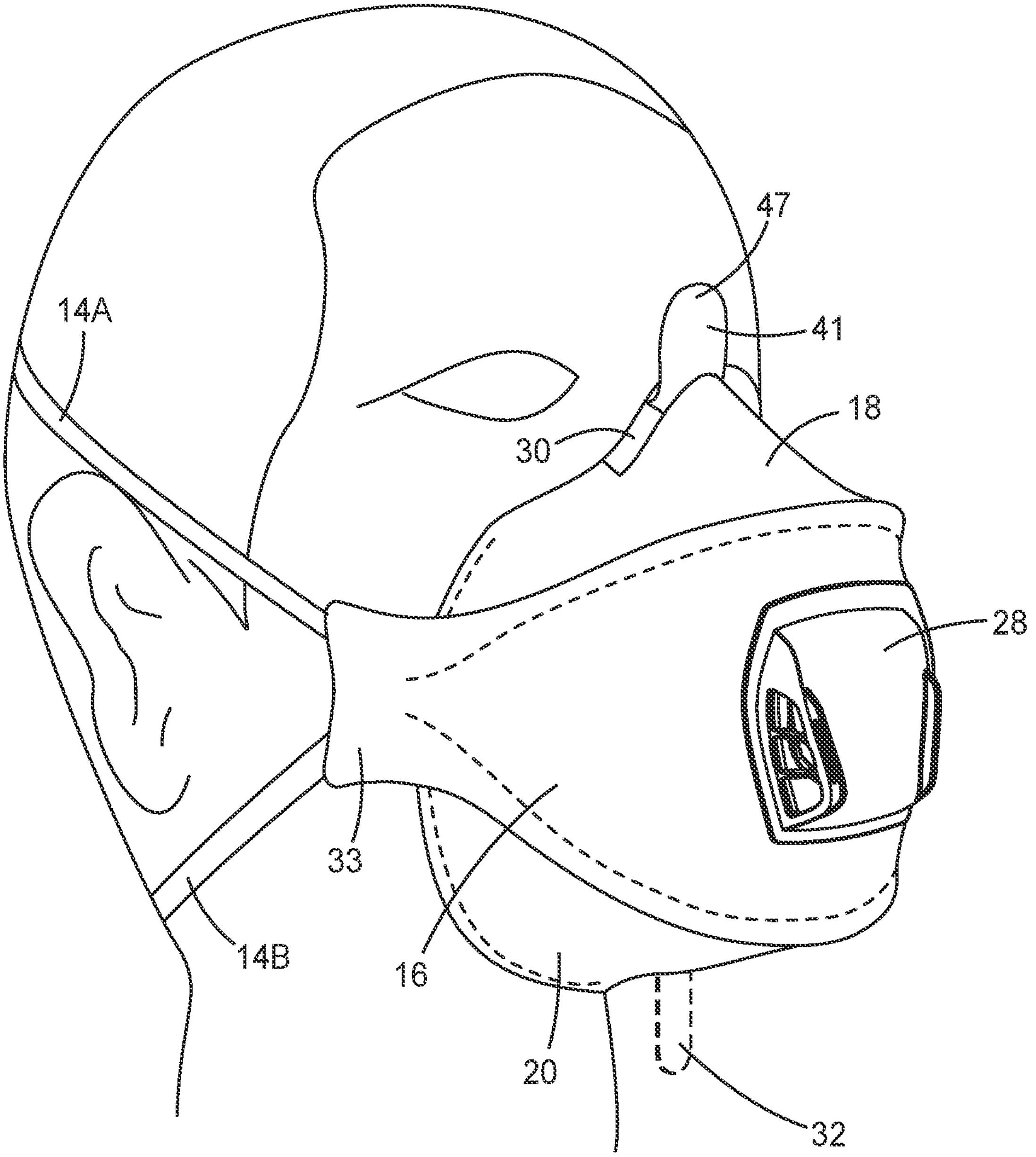
FIG. 9 is a front perspective view of the personal respiratory protection device of FIG. 1 shown in its open configuration on the face of a user.

Once the respirator 10 is open, the user is able to position the open cup-shaped air chamber of the respirator over the face and position the headbands as shown in FIG. 9 in order to don the respirator.

Figure 10:
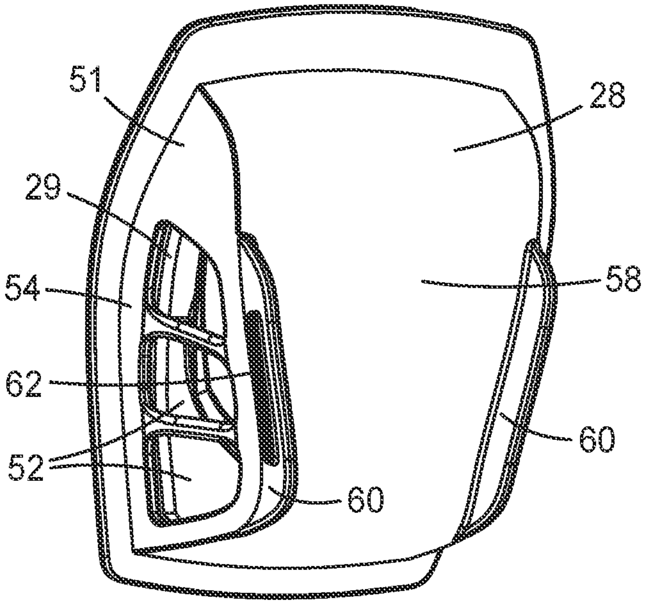
FIG. 10 is a detailed front perspective view of the valve of the personal respiratory protection device of FIG. 1.

In order to more readily position the respirator 10 in use, the respirator is provided with a valve 28 with grip portions 29 which are shown in greater detail in FIG. 10. The valve 28 is adhered to the central portion using an adhesive such as that commercially available under the trade designation 3M™ Scotch-Weld™ Hot Melt Spray Adhesive 61113M™. The valve 28 has side walls 51 which include apertures 52 to allow the exhaled air to pass through the valve 28. The side walls 51 have a curved form with an inwardly extending mid-portion and outwardly extending base 54 and upper section 56. Arranged on a top surface 58 of the valve 28 are upwardly extending ridges 60 which carry outwardly extending ribs 62.

The curved side walls 51 act as a grip region 29 since the curves match the curvature of the fingers of the user. The performance of the grip region is improved by the provision of the ridges 60 which extends the grip region. Performance is further improved by the provision of the ribs 62 which make the grip region 29 easier to grip and hold. The curved side walls 51, ridges 60 ribs 62 individually and collectively form an indicia to the user that the grip region 29 is to be gripped.

FIG. 10 shows an alternative embodiment of valve 28' which differs from valve 28 in that it has taller ridges 60'. It is conceivable within the scope of the invention that other forms of grip region could act as indicia to the user, for example a textured or colored surface to the side walls 50, ridges 60 and/or ribs 62.

Figure 11:
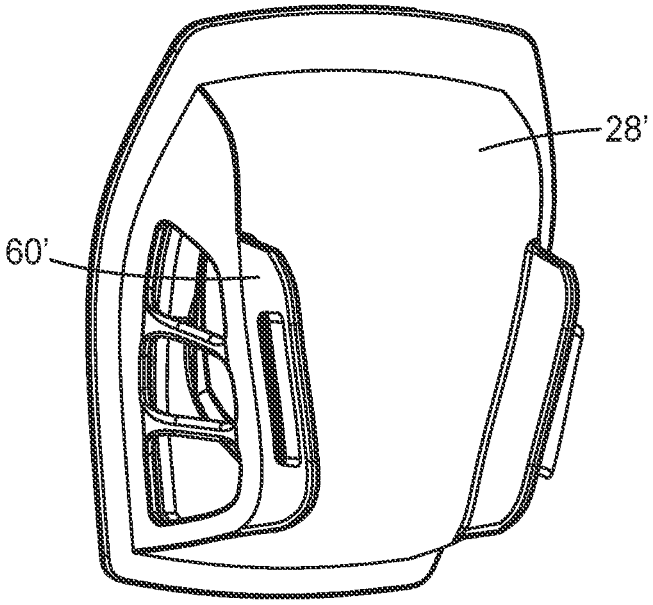
FIG. 11 is a detailed front perspective view of an alternative embodiment of the valve of the personal respiratory protection device of FIG. 1.

Turning now to FIGS. 11 and 12, the attachment of the headband 14 to the headband attachment lug 31, 33 is shown in greater detail. The headband 14 is attached to the main body 12 by a head band module indicated generally at 70. The module 70 has a headband 14 which is bonded on its upper side to an upper tab 72 and on its lower side to a lower tab 74. The tabs 72, 74 are formed of a non-woven material used to form the filter material described above. The non-woven material tabs 72, 74 are bonded to the headband 14 using a known adhesive 78 such as that commercially available under the trade designation 3M™ Scotch-Weld™ Hot Melt Spray Adhesive 6111.

The module 70 is then ultrasonically welded to the lug 31, 33 to form a weld 76 between the lower tab 74 and the main body 12.

In FIG. 11 the head band module is shown with the respirator in its folded position. As the respirator 10 is opened the headband becomes stretched and pulls outwardly on the lugs 31, 33.

In FIG. 12 the head band module is shown with the respirator in its open position. The stretching of the headband 14 causes the module 70 to curve which leads to the lower tab 74 being held in tension. This causes a high load to act at the point of intersection D of the lower tab 74 and the lug 31, 33. However, the weld 76 is relatively strong in peel mode (that is to say the extreme tension load applied to the edge of the weld at point D by the stretching of the headband). This provides an improvement over prior art attachment techniques which place an adhesive bond in peel mode rather than a weld which is far stronger in peel than an adhesive.

It will be appreciated that certain features described herein could be used in isolation or in conjunction for the benefit of the invention. For example, it is envisaged that any one or more of the following features could be advantageously combined with the current invention.

What is claimed is:

1. A personal respiratory protection device comprising:
- an upper panel,
- a central panel, and
- a lower panel,
- the central panel being separated from each of the upper and lower panels by a first and second fold, seam, weld or bond, respectively, such that the device is capable of being folded flat for storage along the first and second fold, seam, weld or bond and opened to form a cup-shaped air chamber over the nose and mouth of the wearer when in use,
- wherein the upper panel has a graspable upper tab, the upper tab being graspable in use to open the device, characterized in that the upper tab is moveable between a stowed position in which a tip section of the upper tab rests against the upper panel and a deployed position in which the upper tab projects away from the upper panel.

2. The personal respiratory protection device of claim 1 wherein the upper tab remains in the deployed position until such time as it is returned to the stowed position.

3. The personal respiratory protection device of claim 1, wherein the upper tab folds about a line of attachment to the upper panel when moving between the stowed and deployed positions.

4. The personal respiratory protection device of claim 3, wherein the device includes a nose clip for conforming to the nose of a user, the line of attachment of the upper tab being proximate the nose clip such that the upper tab acts on the nose clip to deform the nose clip during opening of the device.

5. The personal respiratory protection device of claim 1, wherein the lower panel has a graspable lower tab attached to an interior portion of an external surface of the lower panel, the lower tab being graspable in use in conjunction with the upper tab to open the device.

6. The personal respiratory protection device of claim 5, wherein the lower panel has a lateral storage fold when stored, the fold extending through the interior section, wherein the lower tab is attached to the lower panel at a position proximate the lateral storage fold.

7. The personal respiratory protection device of claim 6, wherein the lower tab is positioned within 10 mm above or below the lateral fold.

8. The personal respiratory protection device of claim 6, wherein the lower tab is positioned on the lateral fold.

9. The personal respiratory protection device of claim 5, wherein the lower tab is between 10 mm and 40 mm in width at its point of attachment to the lower panel.

10. The personal respiratory protection device of claim 5, wherein the lower tab is positioned on a longitudinal centerline of the device.

11. The personal respiratory protection device of claim 5, wherein at least a portion of the lower tab is visible to a user when the device is folded.

12. The personal respiratory protection device of claim 1, wherein the lower panel is folded to form a lateral fold at a position approximately equidistant between the second fold, seam, weld or bond and a lower outer periphery of the lower panel.

13. The personal respiratory protection device of claim 1, wherein the device has a multi-layered structure that comprises a first inner cover web, a filtration layer that comprises a web that contains electrically-charged microfibers, and a second outer cover web, the first and second cover webs being disposed on first and second opposing sides of the filtration layer, respectively, wherein a nose conforming element is attached to the second cover web.

14. The personal respiratory protection device of claim 1 further comprising a resiliently compliant headband secured to the central panel.

15. The personal respiratory protection device of claim 1, wherein the graspable upper tab is attached to an outer surface of the upper panel.

16. A personal respiratory protection device comprising:
- an upper panel,
- a central panel, and
- a lower panel,
- the central panel being separated from each of the upper and lower panels by a first and second fold, seam, weld or bond, respectively, such that the device is capable of being folded flat for storage along the first and second fold, seam, weld or bond and opened to form an air chamber over the nose and mouth of the wearer when in use,
- wherein the upper panel has a graspable upper tab attached to an outer surface of the upper panel, the upper tab being graspable to open the device, characterized in that the upper tab is moveable between a stowed position in which the tab rests against the upper panel and a deployed position in which the upper tab projects away from the upper panel.

* * * * *